United States Patent [19]

Rost

[11] 4,221,627
[45] Sep. 9, 1980

[54] DEVICE FOR CONNECTING TOGETHER STEEL CORD INSERTS FOR VEHICLE TIRES

[75] Inventor: Harry Rost, Munich, Fed. Rep. of Germany

[73] Assignee: Metzeler Kautschuk AG, Munich, Fed. Rep. of Germany

[21] Appl. No.: 954,734

[22] Filed: Oct. 26, 1978

Related U.S. Application Data

[63] Continuation-in-part of Ser. No. 892,856, Apr. 3, 1978, abandoned, which is a continuation of Ser. No. 809,699, Jun. 24, 1977, abandoned.

[30] Foreign Application Priority Data

Jun. 26, 1976 [DE] Fed. Rep. of Germany ....... 2628887

[51] Int. Cl.² ...................... G03D 15/04; B32B 31/00
[52] U.S. Cl. .................................... 156/507; 156/512
[58] Field of Search ............... 156/405 P, 304, 512, 156/502, 507

[56] References Cited

U.S. PATENT DOCUMENTS

| | | | |
|---|---|---|---|
| 2,962,083 | 11/1960 | Hasselquist | 156/512 |
| 3,100,731 | 8/1963 | Brey | 156/502 |
| 3,325,328 | 6/1967 | Henley | 156/502 |
| 3,616,085 | 10/1971 | Printz | 156/512 |
| 3,630,803 | 12/1971 | Printz | 156/512 |
| 4,087,308 | 5/1978 | Baugher | 156/512 |

Primary Examiner—Douglas J. Drummond
Attorney, Agent, or Firm—Armstrong, Nikaido, Marmelstein & Kubovcik

[57] ABSTRACT

A device for connecting steel cord web sections, consisting of steel cord webs having steel threads disposed in a longitudinal direction, to form a steel cord web with steel threads disposed at an angle to the longitudinal direction of the original steel cord web. This device comprises a conveyor belt means having a plurality of narrow belts for feeding the steel cord web sections and retaining means for clamping the seam portions of the steel cord web sections to be connected. Also included are means for bringing together and joining, at a connecting point, the connection faces of the seam portions of the steel cord sections to be connected.

The improvement of this invention lies in the conveyor belt means comprising an incoming conveyor belt having an upper section extending beneath the connection point and an outgoing conveyor belt having a plurality of narrow belts spaced with respect to one another for advancing the steel cord web which is produced. The outgoing conveyor belt extends beneath the connection point where the incoming conveyor belt and the outgoing conveyor belt interlock with one another beneath the connection point. Also, retaining means is positioned above the conveyor belt means.

5 Claims, 6 Drawing Figures

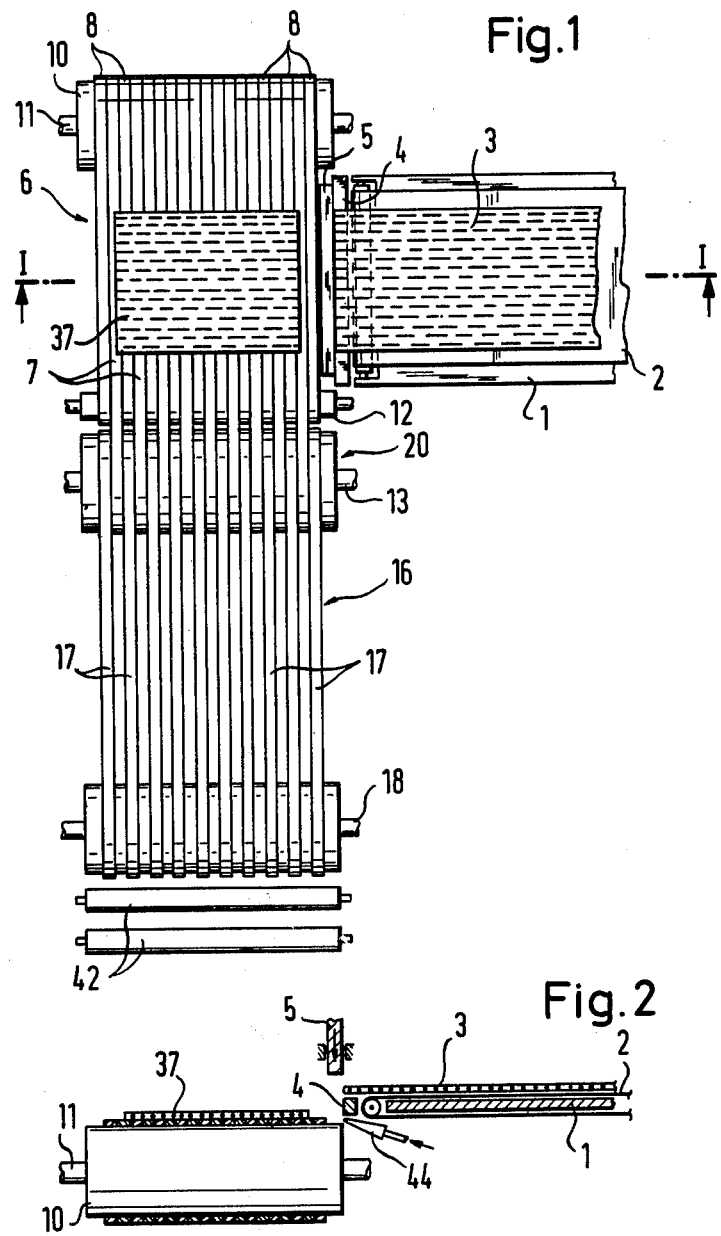

DEVICE FOR CONNECTING TOGETHER STEEL CORD INSERTS FOR VEHICLE TIRES

This application is a continuation-in-part of my copending application Ser. No. 892,856 filed Apr. 3, 1978 now abandoned, which is a continuation of application Ser. No. 809,699 filed June 24, 1977, now abandoned.

BACKGROUND OF THE INVENTION

1. Field of the Invention:

The present invention relates to a device for connecting steel cord web sections of a steel cord web with steel threads disposed in the longitudinal direction into a steel cord web with steel threads disposed at an angle with respect to the longitudinal direction of the original steel cord web. The term "longitudinal direction" herein refers to the longitudinal direction of the original steel cord web.

2. Description of the Prior Art:

Steel cord is needed in the construction of carcasses for air tire blanks. Steel cord refers to webs in which steel wires or steel threads are enclosed between two layers of rubber. Steel threads are presently in the steel wire or they are formed by twisting at least two thin steel wires. The steel threads are arranged next to one another, generally without a warp thread. In the conventional method of producing a continuous web, the steel threads which form the web are disposed in the longitudinal direction of the web. However, the steel threads for the carcasses of the tire must be disposed at an angle, more specifically at right angles to the circumferential direction of the tire. Accordingly, to construct the carcass, sections of a steel cord web are needed in which the steel threads are disposed at an angle and, more specifically, almost perpendicular to the longitudinal direction of the steel cord web. This is generally produced by separating steel cord web sections from a steel cord web having steel threads disposed in the longitudinal direction thereof. The web sections are then rotated in their plane generally about 90° and joined along their side edges so as to form a steel cord web with steel threads disposed at an angle almost perpendicular to its longitudinal direction. Sections corresponding to the circumference of the carcass are then cut from the thus formed steel cord web.

During the handling of the steel cord web sections and connection of the same to form a steel cord web with steel threads disposed at an angle or almost perpendicular to its longitudinal direction, special problems result from the nature of non-vulcanized rubber, namely from its tendency to stick to other objects, its very plastic consistency and the lengthening or stretching under its own weight if it hangs free and is not supported. Accordingly, if the web is frictionally displaced on a support, it will be stretched as a result of adhesion to the support and as a result of the force that is barely exerted thereupon in order to advance the same. If, on the other hand, the web is advanced in a freely suspended manner to avoid adhesion, it stretches as a result of its own weight. Stretching of the web is a disadvantage, as not only is its thickness changed, but also the lateral spacing of the steel threads is changed. Owing to the fact that the respective forces are not uniformly distributed, problems other than those discussed are also produced.

SUMMARY OF THE INVENTION

In view of this situation, the object of the invention is to provide a device which eliminates the above disadvantages.

This device includes apparatus for moving the steel cord web sections together at a connection point which connects a steel cord web section to be connected and the already connected steel cord web.

The solution to this problem according to the invention comprises apparatus for applying the steel cord web to the connection point, which apparatus includes an incoming conveyor belt with a stretched upper section extending under the connection point of the steel cord web sections, and an outgoing conveyor belt consisting of spaced narrow belts, such as cone belts, which is provided to advance the connected steel cord web. The stretched section of the outgoing conveyor belt extends under the connection point and the incoming conveyor belt and the outgoing conveyor belt engage one another in a comb-like manner by means of narrow, cone belts coming into a comb-type engagement point. Similarly constructed incoming and outgoing pusher belts consisting of narrow belts such as cone belts are spaced apart from one another, and are provided opposite the incoming conveyor belt and for the outgoing conveyor belt, the incoming pusher belt and the outgoing pusher belt interlocking in a comb-type manner above the connection point by virtue of their narrow belts or cone belts. A mating engagement point is established in which the incoming conveyor belt and the incoming pusher belt, and the outgoing conveyor belt and outgoing pusher belt are drivable in synchronism and in spurts. The size of the gap between the faces of the conveyor belts and of the steel cord web sections, or steel cord web and the pusher belt, is determined by the thickness of the steel cord web sections or the steel cord web, taking into consideration the consistency thereof for purposes of clamping between the incoming or outgoing conveyor belt and the particular pusher belt.

Another feature of the invention is that a feeder belt consisting of narrow belts or cone belts, disposed apart from one another, is provided within the incoming conveyor belt and driven in synchronism therewith, and the narrow belts or the cone belts of the feeder belts are disposed in the intermediate spaces between the narrow belts or cone belts of the incoming conveyor belt and with the same form in common supporting face for the steel cord web sections.

According to another feature of the invention, the interlocking engagement points between the incoming and outgoing conveyor belts and engagement points between the incoming and outgoing pusher belts are disposed at an axis on freely rotatable discs having a width corresponding to that of the narrow belt or the cone belts.

It is also proposed according to the invention that the means for connecting the steel cord web sections to be joined could also consist of a device for deflecting the interlocking engagement points between the incoming and outgoing conveyor belts and the incoming and outgoing pusher belts from a plane common to the conveyor belts or the upper pusher belts, thereby producing an additional curved conveyor belt section between the small sections of the conveyor belt.

This provides an advantageous solution in that the axes are adjustably mounted in an approximately perpendicular direction with respect to the common advancement plane of the conveyor belt, and that at least one pressure medium acts on each of the axes to raise and lower the same and thus to deflect and guide in the interlocking engagement points.

BRIEF DESCRIPTION OF THE DRAWINGS

Other objects, features and advantages of the present invention will be made apparent in the course of the following description of a preferred feature thereof provided with reference to the accompanying drawings in which:

FIG. 1 is a diagrammatic plan view of the cutting device;

FIG. 2 is a section along line I—I of FIG. 1;

DETAILED DESCRIPTION OF THE PREFERRED EMBODIMENT

FIGS. 1 and 2 show a cutting device for steel cord webs. A conveyor belt 2 or the like, passing over a feed table 1, supplies a steel cord web 3 to a cutting machine. The cutting machine consists of a lower cutting bar 4 and an upper blade 5. The steel cord web is removed from a cord ball (not shown) coming directly from the calender and comprises steel threads extending lengthwise with respect to the web.

Figure 3:
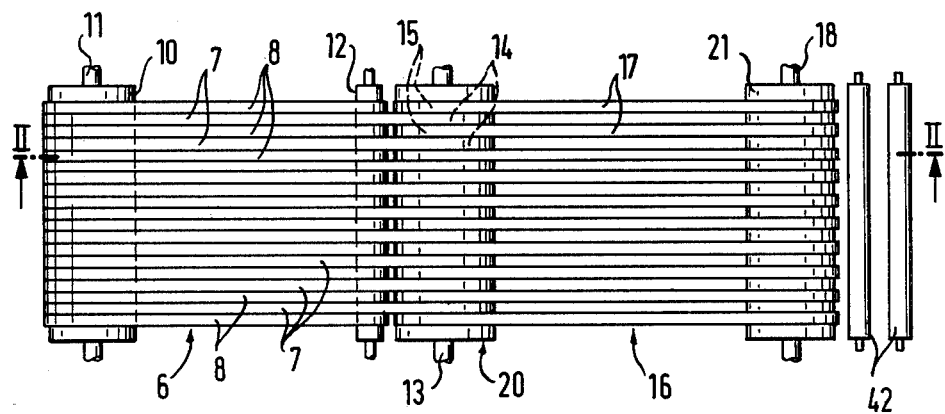
FIG. 3 is a plan view of the rear part of the connecting device.

A feeder 6, which is directly adjacent to the cutting machine, extends at right angles to the conveyor belt 2 and the steel cord web 3. The feeder 6 consists of a plurality of V belts 7 and 8 which run adjacent to one another on its upper side and form a conveying surface 9. As shown in FIGS. 1, 2 and 3, all the V belts 7 and 8 are guided on V belt pulleys 10 about a common drive shaft 11.

The common drive shaft 11 simultaneously serves to tension the V belts. These belts are disposed closely adjacent to one another and extend lengthwise to the cutting bar 4. They form a smooth, unbroken conveying surface 9 over their entire length.

As shown in FIGS. 1 and 3, only the V belts extend over the entire length of the feeder 6. The V belts 8 are deflected before reaching the end of the feeder zone by means of a free-running deflecting shaft 12 and corresponding V belt pulleys. The V belts 7 pass to a coupling shaft 13 which forms the end of the feeder zone 6. It comprises a plurality of V belt pulleys 14 and 15 of uniform diameter, which are disposed adjacent to one another and individually mounted on the shaft. A V belt 7 of the feeder 6 is mounted on every second V belt pulley 14 and the intermediate V belt pulleys 16 are occupied by the V belts 17 of a take-off device 16. The other end of the take-off device 16 is represented by a shaft 18 on which the V belt pulleys 21 are mounted and which is used to drive and tension the V belts 17. The feeder 6 and the take-off device 16 can be operated independently of one another.

Figure 4:
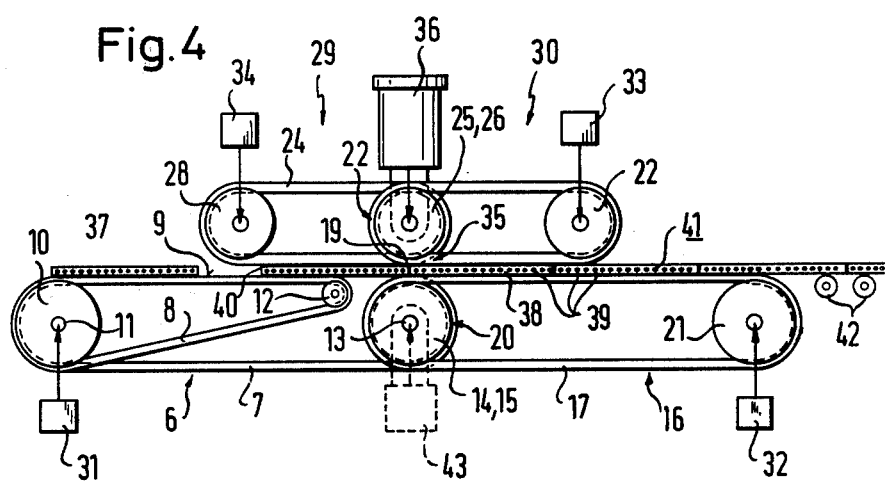
FIG. 4 is a side view of the connecting device along the line II—II in FIG. 3.

According to FIGS. 3 and 4, a device for connecting steel cord web sections, with steel threads disposed in the longitudinal direction, to form a steel cord web 41 having steel threads 39 disposed at an angle with respect to the longitudinal direction of the steel cord web 41 consists of an incoming conveyor belt 6, an outgoing conveyor belt 16, a pusher belt 29 above the incoming conveyor belt 6, an outgoing pusher belt 30 over the outgoing conveyor belt 16 and a feeder belt 6'.

The incoming conveyor belt 6 consists of cone belts 7 disposed with lateral spacing with respect to one another, a drive drum 10 driven by means of a motor 31 and comprising a shaft 11 and cone belt discs 14 rotatably mounted with lateral spacing with respect to one another. The outgoing conveyor belt 16 of cone belts 17 is disposed with a lateral spacing with respect to one another, plus a drive drum 21 is driven by means of a motor 32 and comprises a shaft 18 and cone belt discs 15 rotatably mounted between the cone belt discs 14 and the axis 13 with lateral spacing with respect to one another. The incoming pusher belt 29 of cone belts 24 are disposed with lateral spacing with respect to one another, a drive drum 28 is driven by means of a motor 34 and cone belt discs 25 are rotatably mounted on an axis 13' with lateral spacing with respect to one another. The outgoing pusher belt 30 of cone belts 22 is disposed with lateral spacing with respect to one another, a drive drum 23 is driven by means of a motor 33 and cone belt disc 26 is rotatably mounted on the axis 13' with lateral spacing with respect to one another between the cone belt discs 25. The feeder belt 6' of cone belts 8 is disposed with lateral spacing with respect to one another and, together with the incoming conveyor belt 6, is driven by motor 31 on the drive drum 10 and deflecting roller 12. The cone belts 8 of the feeder belt 6' are disposed between the cone belt 7 of the incoming conveyor belt 6 so that, together with the cone belt for the steel cord web sections 7, they essentially form a closed supporting face 9 until shortly before the connection point 19, the point at which the steel cord web sections 37 are joined to form the steel cord web 41.

In the above described embodiment, the incoming conveyor belt 6 and the outgoing conveyor belt 17 are in interlocking engagement via their cone belts 7 and 17 below the connection point 19, and the incoming pusher belt 29 and the outgoing pusher belt 30 are in interlocking engagement via their cone belts 24 and 22 above the connection point 19. Thus, they each form an interlocking engagement point E or E'. The pusher belts 29 and 30 are shorter than the conveyor belts 6 and 16.

The axis 13' and, if desired, the axis 13, are adjustably mounted in a direction which is essentially perpendicular to the operating direction of the device, thereby enabling the width of the gap 35 and the pressure exerted by the steel cord web section and the steel cord web at the connection point to be adjusted. A pressure medium cylinder 36 or another pressure medium cylinder 43 are provided to adjust the axes 13' and 13 and to exert pressure in the direction of the connection point.

Just as other provisions are possible in special cases, the incoming conveyor belt 6 with the feeder belt 6' and the incoming pusher belt 29 are generally in the normal operation different in synchronism with one another, for example, as a result of the synchronous switching of the motors 31 and 34, and the outgoing conveyor belt 13 and the outgoing pusher belt 30 are drivable in synchronism by virtue of the synchronous switching of the synchronism by identical drive rates of the cone belts 7 and 24 and 17 and 22.

The following is the mode of operation of the above embodiment of the device.

Either a steel cord web section 37 or, as shown, a prepared steel cord web 41 is drawn into the device until its rear connecting face is disposed at the connection point. The holding means for the steel cord web section or the steel cord 41 consists of the outgoing pusher belt 30 against the outgoing conveyor belt 16. In other words, this steel cord web section, or steel cord web 41, is held or clamped between the outgoing pusher belt 30 and the outgoing conveyor belt 16. The motors 32 and 33, and thus the outgoing conveyor belt 16 and the outgoing pusher belt, are in a rest state.

By starting the motors 31 and 32, and as a result of the synchronized operation of the incoming conveyor belt 6 and the feeder belt 6' and of the incoming pusher belt 29, a steel cord web section 37 is advanced in the direction of the connection point 19 and is held or clamped on the part of its path following the initial part between the incoming conveyor belt 6 and the incoming pusher belt 29. Accordingly, these represent the retaining means for the steel cord web section 37 to be joined to the steel cord web 41. When the leading connection face of the steel cord web section 37 engages the face area of the prepared steel cord web 41, the connection is formed as a result of the marked application of the rubber or specifically of the non-vulcanized rubber. In this instant, the motors 32 and 33 are set into operation and with synchronous operation, i.e., operating of the belts at the same rates, and the steel cord web 41 is advanced by the length of a steel cord web section 37.

This operation is continuously repeated, thereby forming from the individual steel cord web sections 37 into a steel cord web 41 comprising steel threads 39 disposed at right angles to the longitudinal direction.

The steel cord web sections 37 are not set in contact in succession under the incoming conveyor belt with the feeder belt 6' but in close succession with spaces between one another.

Figure 5:
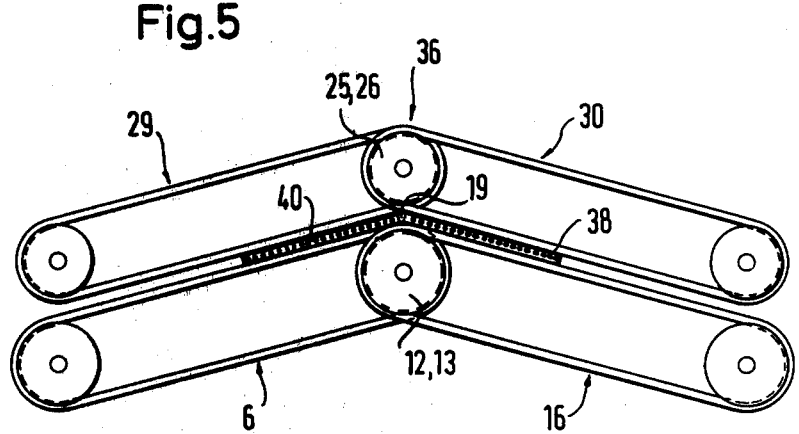
FIG. 5 shows a feature comprising a folding connecting device.
Figure 6:
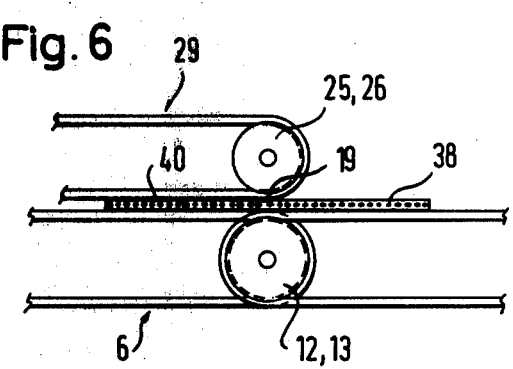
FIG. 6 shows the feature according to FIG. 5 in the extended position.

In the alternative embodiment of the device shown in FIG. 5 in one position and in FIG. 6 in another position, the axes 13 and 13', and thus the interlocking engagement points E and E' between the incoming conveyor belt 6 and the operating conveyor belt 16 and between the incoming pusher belt 29 and the outgoing pusher belt 30 are upwardly deflectable from their common plane, which is represented in the drawing in an exaggerated fashion. Thus, in the position shown in FIG. 5, a curved but small conveyor belt section is produced at the connection point 19.

In this embodiment, the device for deflecting the interlocking engagement point represents entirely or partially the means for bringing together the connection faces. This is achieved in that the steel cord web section 37 is moved to the steel cord web 41, initially in the manner already described, but a space of up to one of the lengths of the curved conveyor belt section may still remain between the two connection faces. The steel cord web section 37 is enjoined to the steel cord web 41 by lowering the interlocking engagement surfaces until they are in a position at which the belts are in one plane or on planes parallel with respect to one another. In the course thereof, the arched or curved conveyor belt 6 is out of contact and the connection faces become together.

With the embodiment shown in FIGS. 5 and 6, it is possible to compensate for greater tolerances in the length of the steel cord web section 37 and/or the switching and conveyor paths of the belt, then with the embodiment shown in FIGS. 3 and 4.

The essential advantages of the device according to the invention is that the steel cord web sections and the steel cord web which, as a result of the nature of the rubber and the non-vulcanized rubber, possess a marked adhesion tendency and a soft plastic state do not have to slide at any point of the device nor are they slidably guided. They are always carried resting on a displaced support. At no point are they without an underlying support and thus are never allowed to hang, causing lengthening or stretching as a result of their own weight and plastic state.

The present invention may be embodied in other specific forms without departing from the spirit or essential characteristics thereof. The presently disclosed embodiments are therefore to be considered in all respects as illustrated and not restrictive, the scope of the invention being indicated by the appended claims rather than the foregoing description, and all changes which come within the meaning and range of equivalency of the claims are, therefore, to be embraced therein.

What is claimed:

1. In a device for connecting steel cord web sections, of steel cord webs having steel threads disposed in the longitudinal direction, to form a steel cord web with steel threads disposed at an angle to the longitudinal direction of the original steel cord web, said device comprising:

a conveyor belt means having a plurality of narrow belts for feeding the steel cord web sections;

retaining means for clamping the seam portions of the steel cord web sections to be connected; and means for bringing together and joining, at a connecting point, the connection faces of the same portions of the steel cord sections to be connected;

the improvement wherein the conveyor belt means comprises an incoming conveyor belt having an upper section extending beneath the connection point, an outgoing conveyor belt having a plurality of narrow belts spaced with respect to one another for advancing the steel cord web which is produced, the outgoing conveyor belt extending beneath the connection point;

wherein the incoming conveyor belt and the outgoing conveyor belt interlock with one another beneath the connection point; and wherein the retaining means is positioned above the conveyor belt means, said retaining means comprising incoming and outgoing pusher belts having a plurality of narrow belts spaced with respect to one another, the incoming pusher belt and the outgoing pusher belt interlocking with one another above the connection point, said device further including drive means for driving said conveyor belt means wherein the incoming conveyor belt and the incoming pusher belt and the outgoing conveyor belt and the outgoing pusher belt are drivable in pairs, said pairs being drivable in synchronism, and the size of the gap between the conveyor belt means and the retaining means cooperating therewith is determined by the thickness of the steel cord web section or the steel cord web such that the web section and web are clamped between the conveyor belt means and the retaining means.

2. A device as claimed in claim 1 including a feeder belt having a plurality of narrow belts provided within the incoming conveyor belt and driven synchronously therewith, wherein the narrow belts of the feeder belt are disposed in the intermediate spaces between the narrow belts of the incoming conveyor belt.

3. A device as claimed in claim 1 including a plurality of freely rotatable discs having a width equal to the width of the narrow belts, said discs being positioned at the connection point wherein said conveyor belt means and said retaining means are mounted on said discs.

4. A device as claimed in claim 1 including deflecting means for deflecting said conveyor belt means and said retaining means at said connection point from a common plane.

5. A device as claimed in claim 4 including axes adjustably disposed in a direction perpendicular to the common plane of the conveyor belt means, and at least one pressure means for raising and lower the axes to deflect and return the conveyor belt means and the retaining means.

* * * * *